United States Patent
Hong et al.

(10) Patent No.: US 7,911,928 B2
(45) Date of Patent: Mar. 22, 2011

(54) HIGH DENSITY DATA STORAGE DEVICE AND DATA RECORDING OR REPRODUCTION METHOD USING THE SAME

(75) Inventors: Seung Bum Hong, Seongnam-si (KR); Ju Hwan Jung, Seoul (KR); Hyoung Soo Ko, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 989 days.

(21) Appl. No.: 11/710,430

(22) Filed: Feb. 26, 2007

(65) Prior Publication Data
US 2008/0049589 A1    Feb. 28, 2008

(30) Foreign Application Priority Data
Aug. 24, 2006    (KR) .................. 10-2006-0080530

(51) Int. Cl.
*G11B 9/00* (2006.01)
(52) U.S. Cl. ........................................ 369/126
(58) Field of Classification Search .................. None
See application file for complete search history.

(56) References Cited

U.S. PATENT DOCUMENTS

| | | | |
|---|---|---|---|
| 5,481,491 A | 1/1996 | Yamamoto et al. | |
| 6,101,164 A | 8/2000 | Kado et al. | |
| 7,402,736 B2 * | 7/2008 | Moon et al. | 438/551 |
| 2005/0052984 A1 * | 3/2005 | Hong et al. | 369/126 |
| 2006/0153049 A1 * | 7/2006 | Park et al. | 369/126 |

FOREIGN PATENT DOCUMENTS

| | | |
|---|---|---|
| CN | 1604212 A | 4/2005 |
| JP | 1995-105580 A | 4/1995 |

* cited by examiner

*Primary Examiner* — Paul Huber
(74) *Attorney, Agent, or Firm* — Sughrue Mion, PLLC

(57) ABSTRACT

A high density data storage device and a data recording or reproduction method using the same, which can record or reproduce high density data without contact, thereby preventing data errors due to contact are provided. The high density data storage device uses a recording medium and a probe. The recording medium is a thin film made from phase change material or oxide resistance change material, and the probe has a tip formed in a lower portion thereof, which moves with a spacing from the top of the recording medium. Further, recording or reproduction of data is performed through electric field or heat emission, which is generated in the tip of the probe, without direct contact between the recording medium and the probe, so that it is possible to remove instability caused by contact between the recording medium and the probe and to stably record or reproduce data in or from the recording medium without errors.

2 Claims, 3 Drawing Sheets

HIGH DENSITY DATA STORAGE DEVICE AND DATA RECORDING OR REPRODUCTION METHOD USING THE SAME

CROSS-REFERENCE TO RELATED PATENT APPLICATIONS

This application claims priority from Korean Patent Application No. 10-2006-0080530, filed on Aug. 24, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a high density data storage device and a data recording or reproduction method using the same, and more particularly to a high density data storage device and a data recording or reproduction method using the same, which can record or reproduce high density data without contact, thereby preventing data errors due to contact.

2. Description of the Related Art

With the development of Internet-related technology, there is an increased demand for both a recording medium capable of recording mass storage information including moving pictures and means for freely carrying and using the information stored in the recording medium. This is one of many important factors leading the next generation of information recording mediums.

Currently, portable memory devices may be largely classified as solid-state memory devices such as flash memories and disk-type memory devices such as hard disks. However, since the solid-state memory device only has a capacity of several tens of GB, it is difficult to use the solid-state memory device as a large scale data storage device. Further, the hard disk mounted on a portable device is expected to have a capacity of several tens of GB in the near future. However, it is expected that it would be difficult to achieve magnetic recording densities of more than the several tens of GB.

In order to overcome such limitations, technology using a scanning probe or a probe to record and reproduce high density data has been introduced. That is, a method has been introduced, which can record high density data by subdividing a recording medium into areas of several nanometers (nm) to several tens of nm by using Scanning Probe Microscope (SPM) technology.

Specifically, as disclosed in U.S. Pat. Nos. 5,374,493, 5,535,185, and 6,985,377, for example, a high density data storage device of various structures has been introduced, which can record or reproduce high density data by using a probe.

FIG. 1 is a sectional view schematically illustrating a structure used in a related art high density data storage device.

As illustrated in FIG. 1, when the related art high density data storage device records or reproduces information, the tip of a probe 10 makes direct contact with a recording medium 20. For example, the tip of the probe 10 makes contact with data portions 21 and 22. The contact allows resistance to be partially and differentially formed in the recording medium 20, thereby reproducing data recorded in the recording medium 20.

In the related art high density data storage device, when the probe 10 makes contact with the recording medium 20 in order to reproduce the data stored in the recording medium 20, a sensor 50 detects electric current flowing in a path through a power source 40 and the sensor 50 connected to the probe 10, the path including the probe 10, the recording medium 20, and a conductive film 30 electrically connected to the lower portion of the recording medium 20.

However, when recording or reproducing the data recorded in the recording medium 20 in the related art high density data storage device, the probe 10 must make contact with the recording medium 20. Herein, the characteristics of recording or reproduction change depending on the conditions or environments in which the probe 10 makes contact with the recording medium 20. Therefore, the data recorded or reproduced in the related art high density data storage device may change.

When the probe 10 makes contact with the first and second data portions 21 and 22, in order to detect resistance or electric current, the length of the conductive film 30, which is connected to the first and second data portions 21 and 22 and the power source 40 or the sensor 50, changes. Therefore, resistance may change and thus reproduced data may change depending on the data recording positions of the data.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, the present invention provides a high density data storage device capable of operating without contact between a recording medium and a probe so that it is possible to remove the instability of recording or reproduction caused by contact between the recording medium and the probe, and to stably record or reproduce data in or from the recording medium without errors.

According to an aspect of the present invention, there is provided a method for recording or reproducing high density data, wherein data in or from a recording medium can be recorded or reproduced without contact between the recording medium and a probe so that it is possible to stably record or reproduce high density data without errors in a high density data storage device which uses the recording medium and the probe.

According to another aspect of the present invention, there is provided a high density data storage device using a recording medium and a probe, the high density data storage device including: the recording medium being formed as a thin film made from phase change material or oxide resistance change material; and the probe having a tip formed in a lower portion thereof, the tip moving with a spacing from a top of the recording medium.

The tip may have a channel structure of a Field Effect Transistor (FET).

The phase change material may comprise GeSbTe compound or InSbTe compound, and the oxide resistance change material may comprise transition metal oxide.

The recording medium may have a conductive film formed in a lower portion thereof, and the probe is electrically connected to the conductive film.

According to another aspect of the present invention, there is provided a high density data recording or reproduction method comprising both a recording medium formed as a thin film on a substrate (not shown) and a probe moving with a spacing from a surface of the recording medium, the method comprising: moving the probe with the spacing from the surface of the recording medium; applying first and second voltages of different magnitudes to the probe, thereby emitting heat from a tip of the probe; and changing a crystal phase of the recording medium below the probe due to the heat emitted from the tip.

The tip may have a channel structure of a Field Effect Transistor (FET).

According to another aspect of the present invention, there is provided a high density data recording or reproduction method comprising both a recording medium formed as a thin film on a lower electrode and a probe moving with a spacing from a surface of the recording medium, the method comprising: moving the probe with the spacing from the surface of the recording medium; applying voltage between the probe and the lower electrode, thereby generating an electric field between a tip of the probe and the lower electrode; and changing a resistance of the recording medium below the probe due to the electric field between the tip and the lower electrode.

According to another aspect of the present invention, there is provided a high density data recording or reproduction method comprising both a recording medium formed as a thin film on a substrate and a probe moving with a spacing from a surface of the recording medium, the method comprising: moving the probe with the spacing from the surface of the recording medium; applying first and second voltages of different magnitudes to the probe, thereby emitting heat from a tip of the probe; and changing an amount of the heat emitted from the tip of the probe due to heat conduction characteristic of the recording medium below the probe, thereby causing a resistance change in the tip to be detected by the voltage applied to the probe.

According to another aspect of the present invention, there is provided a high density data recording or reproduction method comprising both a recording medium formed as a thin film on a lower electrode and a probe moving with a spacing from a surface of the recording medium, the method comprising: moving the probe with the spacing from the surface of the recording medium; changing the surface electric field of the recording medium due to resistance of the recording medium in a state where a voltage has been applied between the probe and the lower electrode, thereby altering the resistance of a tip of the probe; and applying first and second voltages of different magnitudes to the probe, thereby causing a resistance change in the tip to be detected.

BRIEF DESCRIPTION OF THE DRAWINGS

The above and other aspects of the present invention will be more apparent from the following detailed description when taken in conjunction with the accompanying drawings, in which.

DETAILED DESCRIPTION OF THE EXEMPLARY EMBODIMENTS OF THE INVENTION

Hereinafter, exemplary embodiments of the present invention will be described with reference to the accompanying drawings.

Figure 1:
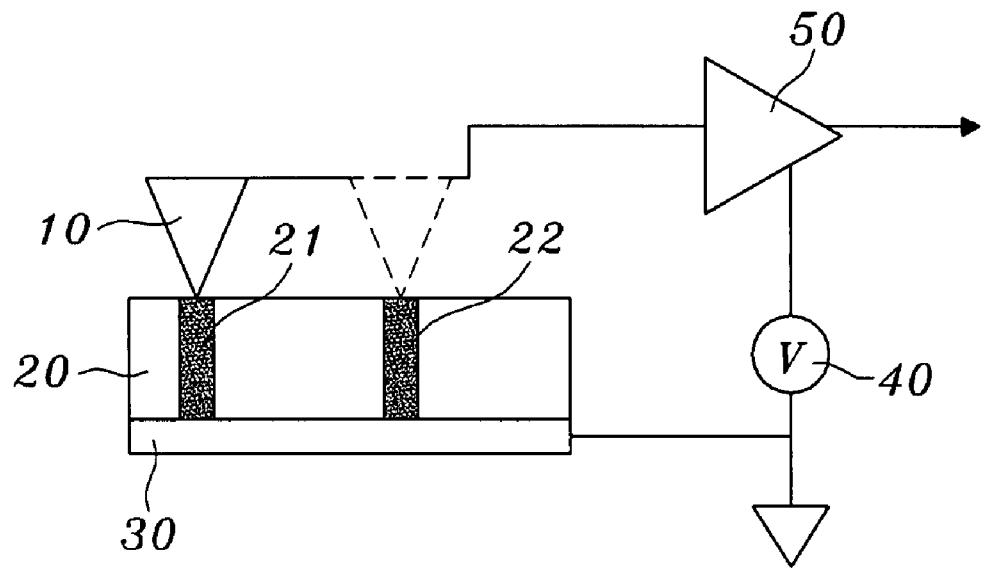
FIG. 1 is a sectional view schematically illustrating a structure used in a related art high density data storage device.
Figure 2:
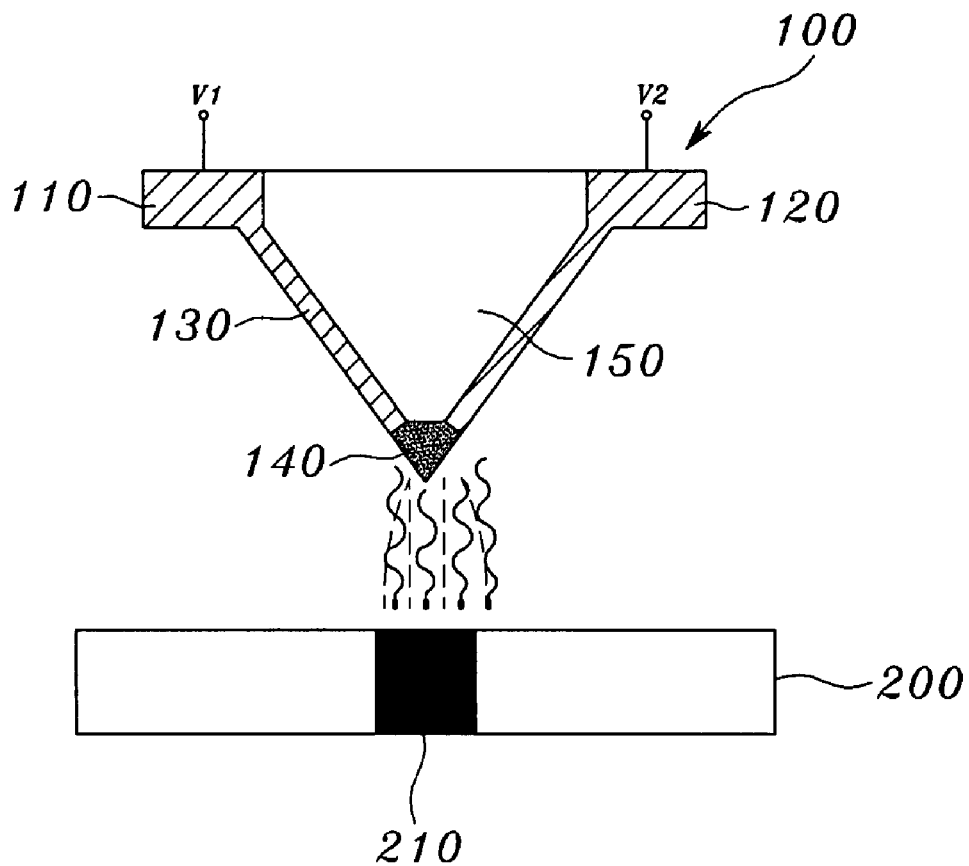
FIG. 2 is a sectional view of a high density data storage device in accordance with a first exemplary embodiment of the present invention.

FIG. 2 is a sectional view of a high density data storage device in accordance with a first exemplary embodiment of the present invention.

As illustrated in FIG. 2, the high density data storage device of the exemplary embodiment of the present invention comprises a recording medium 200 and a probe 100. The recording medium 200 is formed as a thin film made from phase change material on a substrate (not shown), and a probe 100 has a tip 140 formed in a lower portion thereof, which moves with a spacing from the top of the recording medium 200.

It is preferred that the probe 100 is controlled by a controller (not shown) connected thereto so that it is spaced apart from the surface of the recording medium 200 and can move between all data recording positions on the surface of the recording medium.

The probe 100 used for the exemplary embodiment of the present invention has the same shape as that of a Scanning Probe Microscope (SPM) having a Field Effect Transistor (FET) channel structure as disclosed, for example, in Korea Patent No. 10-0366701 and 10-0468849. It is preferred that the tip of the probe has the FET channel structure.

The tip 140 of the probe 100 comprises a vertex of a protruding portion 130 and forms the channel of an FET. A first area 110 and a second area 120, which are electrically connected to the protruding portion 130, correspond to the source and drain regions of the FET, respectively. It is preferred that the probe 100 has a structure in which a first voltage V1 and a second voltage V2 are applied to the first area 110 and the second area 120, respectively.

Further, a third area 150 exists inside the probe 100, i.e. exists between the first area 110 and the second area 120. The third area 150 is doped with a dopant which is different from a dopant of the first area 110 and the second area 120. For example, if the first area 110 and the second area 120 are doped with n-type dopant, the third area 150 is doped with p-type conductive dopant. The doping concentration of the first to third areas 110, 120 and 150 may change depending on the operation conditions of the probe 100, and the tip 140 (channel part) is a relatively low concentration area and has a different doping concentration.

The phase change material used for the recording medium 200 is material in which its crystal phase partially changes between amorphous and crystalline according to changes in temperature. For example, the phase change material comprises GeSbTe compound, InSbTe compound, etc.

When a thin film made from the phase change material is used as the recording medium 200 on the substrate, a current pulse is generated between two terminals due to a difference between the first voltage V1 and the second voltage V2 applied between the first area 110 and the second area 120 of the probe 100, so heat is emitted from the tip 140 which is the FET channel. The emitted heat is transferred to the recording medium 200 around the tip 140, so the crystal phase of the recording medium 200 may change. The recording medium is spaced apart from the tip 140 up to several tens of nm. Therefore, data is recorded in the recording medium 200 due to changes in the crystal phase of the recording medium 200, and thus a data portion 210 is formed. The crystal phase of the recording medium 200 can change from crystalline to amorphous and vice versa through changes in temperature, obtained by adjusting the magnitude of electric current applied to the probe 100.

In the recording medium 200 in which its crystal phase has changed depending on positions of the data recorded in this way, the amount of the heat emitted from the tip 140 of the probe 100, to which voltage has been applied due to the difference between the first voltage V1 and the second voltage V2, may change according to the crystal phase below the probe 100. With the changes in the heat emitted from the tip 140, the temperature of the tip 140 changes, and thus the temperature of the FET channel formed in the tip 140 may change. The resistance of the FET channel changes due to the temperature change, so changes in electric current between the first area 110 and the second area 120 are detected. Accordingly, the crystal phase of the recording medium 200 is detected by the adjacent probe 100, which results in reproduction of data.

Consequently, according to the high density data storage device of the exemplary embodiment of the present invention, it is possible to record or reproduce data in or from the recording medium 200 without direct contact between the recording medium 200 and the probe 100.

Figure 3:
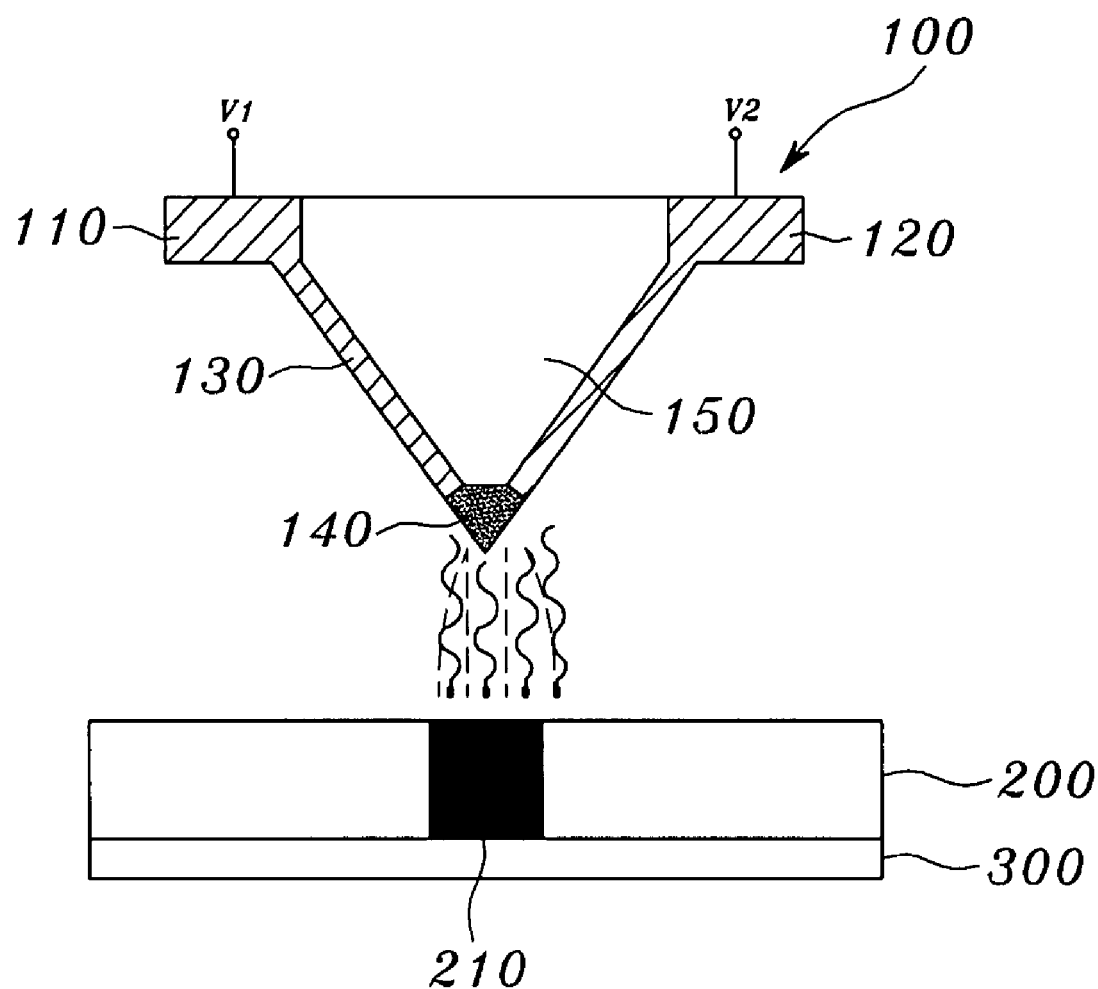
FIG. 3 is a sectional view of a high density data storage device in accordance with a second exemplary embodiment of the present invention.

FIG. 3 is a sectional view of a high density data storage device in accordance with a second exemplary embodiment of the present invention.

As illustrated in FIG. 3, the high density data storage device of the exemplary embodiment of the present invention comprises a recording medium 200, a probe 100 and a conductive film 300. The recording medium 200 is formed as a thin film made from oxide resistance change material on a substrate (not shown), and a probe 100 has a tip 140 formed in a lower portion thereof, which moves with a spacing from the top of the recording medium 200. The conductive film 300 is formed in the lower portion of the recording medium 200 on the substrate.

The probe 100 has the same structure as that of the probe 100 described in the first exemplary embodiment, and the conductive film 300 functions as a lower electrode in the lower portion of the recording medium 200.

The oxide resistance change material used for the recording medium 200 is material in which a conductive filament is partially formed by an electric field. For example, the oxide resistance change material comprises $NiO$, $Al_2O_3$, $TiO_2$, etc., which are transition metal oxides.

When a thin film made from the transition metal oxide (oxide resistance change material) is used as the recording medium 200 on the conductive film 300 of the substrate, if an electric field is generated between the tip 140 of the probe 100 and the conductive film 300 by applying a voltage between the first area 110 or the second area 120 of the probe 100 and the conductive film 300, a conductive filament is partially formed on the recording medium 200 (insulator) spaced apart from the tip by a distance of 140 up to several tens of nm. Resistance partially changes in the recording medium 200 in which the conductive filament has been formed, so a data area 210 is formed in the recording medium 200, in which data is recorded due to partial changes in resistance. The same voltage is applied to the first area 110 and the second area 120, so that the first area 110 and the second area 120 function as one electrode with respect to the lower electrode.

The resistance of the recording medium 200 may change depending on the voltage hysteresis between the probe 100 and the conductive film 300 or between the probe 100 and the recording medium 200. This results from the general characteristics of the oxide resistance change material.

In the recording medium 200 in which the oxide resistance change material has changed into an insulator or a conductor according to the positions of the recorded data, the amount of heat emitted from the tip 140 of the probe 100, which results from a difference between a first voltage V1 and a second voltage V2 which is applied to the probe 100, may change depending on the resistance below the probe 100. As the heat emitted from the tip 140 changes depending on the resistance of the recording medium 200, the temperature of the tip 140 changes, and thus the temperature of an FET channel formed in the tip 140 may change as with the first exemplary embodiment. Herein, the resistance of the FET channel changes due to the temperature change, so changes in electric current between the first area 110 and the second area 120 are detected. Accordingly, the electric conduction state of the recording medium 200 is detected by the adjacent probe 100, which results in the reproduction of data.

Consequently, as with the first exemplary embodiment of the present invention, it is possible to record or reproduce data in or from the recording medium 200 without direct contact between the recording medium 200 and the probe 100.

Figure 4:
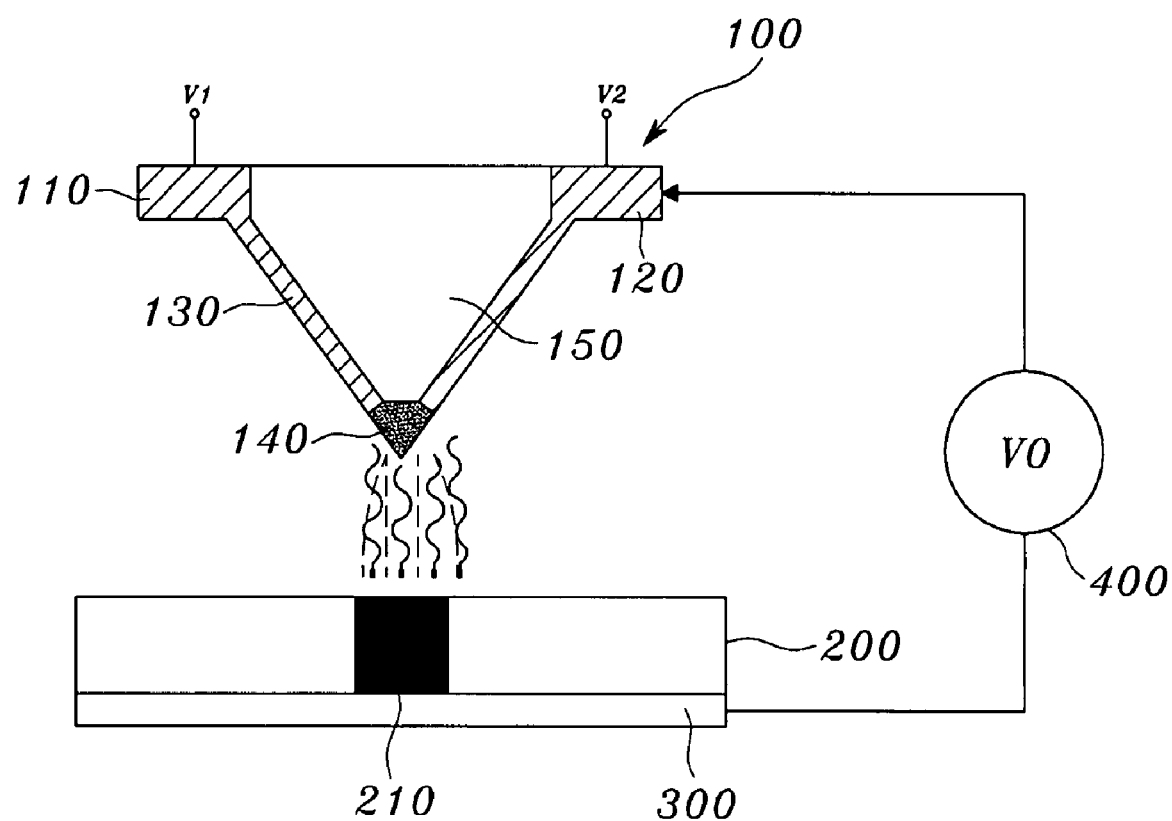
FIG. 4 is a sectional view of a high density data storage device in accordance with a third exemplary embodiment of the present invention.

FIG. 4 is a sectional view of a high density data storage device in accordance with a third exemplary embodiment of the present invention.

As illustrated in FIG. 4, the high density data storage device of the exemplary embodiment of the present invention comprises a recording medium 200, a probe 100 and a conductive film 300. The recording medium 200 is formed as a thin film made from phase change material or oxide resistance change material on a substrate (not shown), and a probe 100 has a tip 140 formed in a lower portion thereof, which moves with a spacing from the top of the recording medium 200. The conductive film 300 is formed in the lower portion of the recording medium 200 on the substrate. Herein, the probe 100 and the conductive film 300 are connected to a power source VO so that the probe 100 and the conductive film 300 are electrically interconnected and voltage can be applied thereto.

The probe 100 has the same structure as that of the probe 100 described in the first exemplary embodiment, and a method by which data is recorded in the recording medium 200 using the phase change material or oxide resistance change material is the same as that described in the first or second exemplary embodiment.

When the crystal phase or resistance of the recording medium 200 changes according to positions of the data recorded in the recording medium 200 and a voltage is applied between the probe 100 and the conductive film 300 through the power source VO, the electric field of a surface of the recording medium 200 changes depending on the crystal phase or resistance of the recording medium 200 adjacent to the probe 100. Therefore, the phase of an FET channel in the tip 140 of the probe 100 may change from a depletion layer to an accumulation layer. Further, the charge concentration around the channel changes, which results in changes in the resistance of the channel. Accordingly, the resistance of the channel is detected through a difference between a voltage V1 and a voltage V2 which is applied to a first area 110 and a second area 120, respectively, and the crystal phase or resistance of the recording medium 200 below the probe 100 is detected, which results in the reproduction of data.

Consequently, also in the third exemplary embodiment of the present invention, it is possible to record or reproduce data in or from the recording medium 200 without direct contact between the recording medium 200 and the probe 100.

Hereinafter, a method for recording or reproducing high density data by using the high density data storage device of the exemplary embodiment of the present invention will be described.

In the above description about the high density data storage device of the exemplary embodiments of the present invention, the principle of the data recording or reproduction method changing depending on the structures of the high density data storage device in the first to the third exemplary embodiments is described. Hereinafter, a recording or reproduction method of the high density data storage device of the exemplary embodiment of the present invention will be described in order, which changes depending on the structures of the high density data storage device.

As described in the first exemplary embodiment, in the high density data recording or reproduction method comprising both the recording medium formed as the thin film on the substrate and the probe 100 moving with a spacing from the surface of the recording medium 200, in order to record data, the probe 100 moves into a position, in which data is to be recorded, after being spaced from the surface of the recording medium 200. Then, first and second voltages of different magnitudes are applied to the probe 100 in order to record the data, so that heat is emitted from the tip 140 of the probe 100.

Therefore, the crystal phase of the recording medium 200 below the probe 100 changes due to the heat emitted from the tip 140 spaced apart from the surface of the recording medium 200, which results in reproduction of data. Herein, it is preferred that the tip 140 has a channel structure of an FET and the recording medium 200 is formed as the thin film made from the phase change material as described above.

In order to reproduce the data recorded in this way, according to the high density data recording or reproduction method of the exemplary embodiments of the present invention, the probe 100 moves with a spacing from the surface of the recording medium 200, and first and second voltages of different magnitudes are applied to the probe 100, so that heat is emitted from the tip 140 of the probe 100.

Next, in the recording medium 200 in which the data has been recorded due to changes in its own crystal phase, the heat conduction characteristic of the recording medium 200 partially changes according to the crystal phase below the probe 100, so the amount of heat emitted from the tip 140 of the probe 100 changes according to the crystal phase of the recording medium 200. Therefore, resistance change occurs in the tip 140 as described above. As a result, the resistance change is detected as a current change by the voltage applied to the probe 100, which results in the reproduction of data.

As described in the second exemplary embodiment, in the high density data recording or reproduction method comprising both the recording medium 200 formed as the thin film on the lower electrode and the probe 100 moving with a spacing from the surface of the recording medium 200, in order to record data, the probe 100 moves into a position, in which data is to be recorded, after being spaced from the surface of the recording medium 200. Then, a voltage is applied between the probe 100 and the lower electrode, so that an electric field is generated between the tip 140 of the probe 100 and the lower electrode.

Therefore, the resistance of the recording medium 200 below the probe 100 changes due to the electric field generated between the tip 140 and the lower electrode, which results in the recording of data. Herein, it is preferred that the tip has a channel structure of an FET and the recording medium is the oxide resistance change material in which the conductive filament is partially formed by the electric field as described above.

A method for reproducing the data recorded in this way is implemented by the same order as that described in the first exemplary embodiment.

As described in the third exemplary embodiment, in the high density data recording or reproduction method comprising both the recording medium 200 formed as the thin film on the lower electrode and the probe 100 moving with a spacing from the surface of the recording medium 200, it is preferred to use the methods described in the first and second exemplary embodiments according to whether the recording medium 200 used in order to record data is phase change material or oxide resistance change material.

In such a case, in order to reproduce the recorded data, according to the high density data recording or reproduction method of the exemplary embodiments of the present invention, the probe 100 moves with a spacing from the surface of the recording medium 200, and a voltage is applied through the power source 400 connected between the probe 100 and the lower electrode.

Herein, the electric field is generated on the surface of the recording medium 200 by the voltage applied between the probe 100 and the lower electrode. Since the generated electric field changes depending on the resistance or crystal phase of the recording medium 200, the surface electric field of the recording medium 200 changes depending on the data recorded in the recording medium 200.

The distribution of charge changes in the tip 140 of the probe 100 due to the surface electric field of the recording medium 200, which results in changes in the resistance of the tip 140 of the probe 100. When first and second voltages of different magnitudes are applied to the probe 100, the resistance change in the tip 140 is detected as a current change, so that the data of the recording medium 200 is reproduced by the probe 100. Herein, the phase of an FET channel in the tip 140 of the probe 100 changes from a depletion layer to an accumulation layer, and the distribution of charge changes depending on the crystal phase and resistance of the recording medium 200.

As described above, the exemplary embodiments of the present invention can achieve the following effects.

The high density data storage device of the exemplary embodiments of the present invention uses phase change material or oxide resistance change material as a recording medium, uses the probe of an FET structure, and performs recording or reproduction of data through electric field or heat emission, which is generated in the tip 140 of the probe 100, without direct contact between the recording medium 200 and the probe 100, thereby removing instability caused by contact between the recording medium 200 and the probe 100 and stably recording or reproducing data in or from the recording medium 200 without errors.

Further, according to a high density data recording or reproduction method of the exemplary embodiments of the present invention, data is recorded or reproduced in or from the recording medium 200 without contact between the recording medium 200 and the probe 100, so that it is possible to stably record or reproduce data in or from the recording medium at a high density without errors.

Although exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A high density data recording or reproduction method which uses both a recording medium formed as a thin film on a substrate and a probe moving with a spacing from a surface of the recording medium, the method comprising:

moving the probe with the spacing from the surface of the recording medium;

applying first and second voltages of different magnitudes to the probe, thereby emitting heat from a tip of the probe; and changing an amount of the heat emitted from the tip of the probe due to a heat conduction characteristic of the recording medium below the probe, thereby causing a resistance change in the tip to be detected due to the first and second voltages applied to the probe.

2. A high density data recording or reproduction method which uses both a recording medium formed as a thin film on a lower electrode and a probe moving with a spacing from a surface of the recording medium, the method comprising:

moving the probe with the spacing from the surface of the recording medium;

changing a surface electric field of the recording medium due to a resistance of the recording medium in a state where a voltage has been applied between the probe and the lower electrode, thereby altering a resistance of a tip of the probe; and applying first and second voltages of different magnitudes to the probe, thereby causing a resistance change in the tip to be detected.

* * * * *